April 15, 1947.　　　　　F. TODD　　　　2,419,042
VACUUM DISTILLATION APPARATUS AND PRESSURE REGULATOR THEREFOR
Filed Oct. 6, 1945
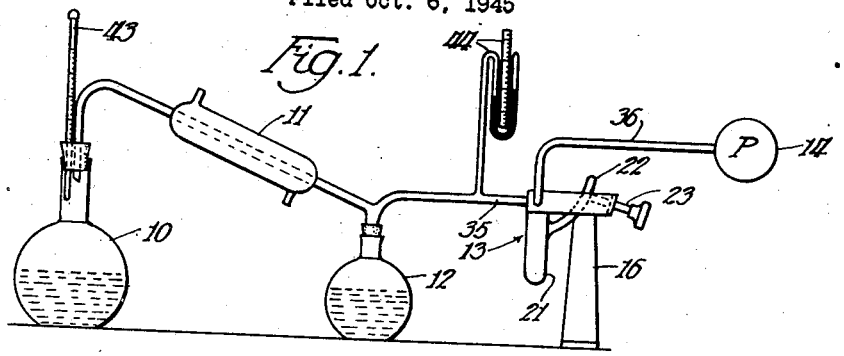
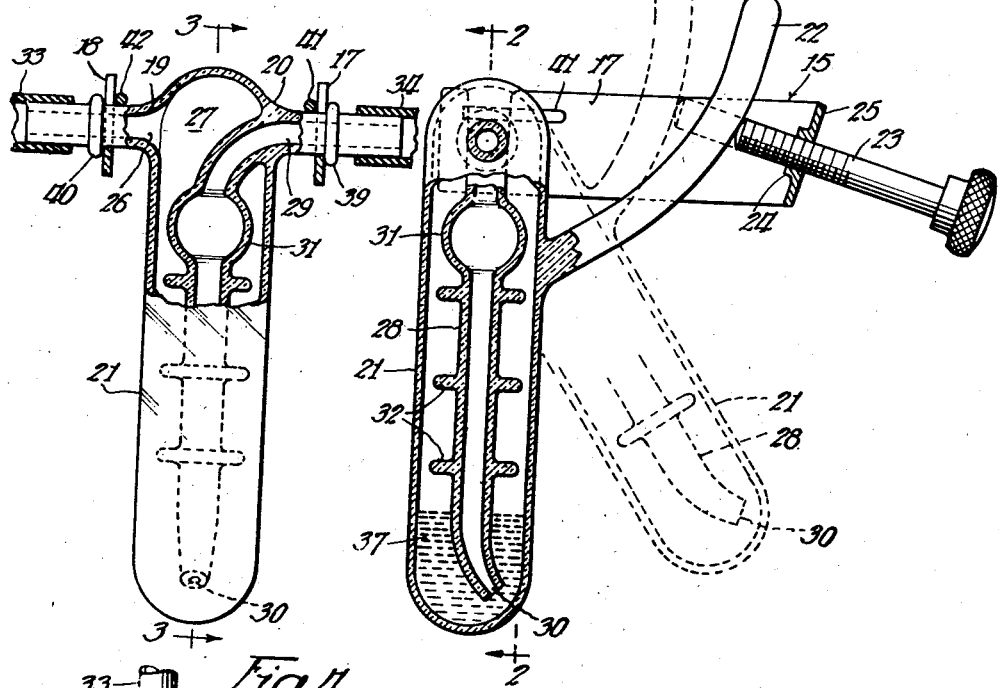
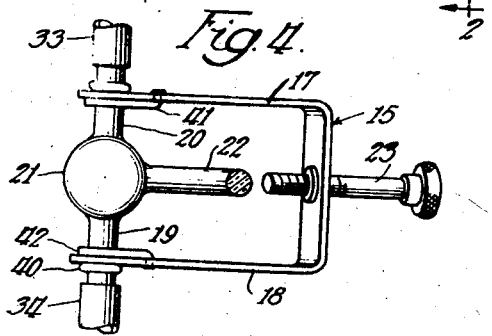
Inventor
Floyd Todd
By: Zabel and Gritzbaugh Attys.

Patented Apr. 15, 1947

2,419,042

UNITED STATES PATENT OFFICE 2,419,042

VACUUM DISTILLATION APPARATUS AND PRESSURE REGULATOR THEREFOR

Floyd Todd, Drexel Hill, Pa.

Application October 6, 1945, Serial No. 620,822

6 Claims. (Cl. 202—205)

This invention relates to improvements in pressure regulators, and in particular, to a device for regulating the pressure of a portion of a fluid system.

That embodiment of my invention which is disclosed herein is particularly adapted to be interposed between a pump and the remainder of the system, in order to create a desired pressure differential between the two. It is obvious, however, that the principles of my invention may be employed in other situations where it is desired to maintain a pressure differential between two parts of a closed system, irrespective of whether or not one part of the system comprises a pump.

During vacuum fractional distillations, small leaks invariably exist in the fractional distillation apparatus, or when changing vacuum receivers. Also small amounts of moisture or gaseous decomposition products frequently develop due to the applied heat. Therefore, the vacuum pressure varies considerably during the various conditions of operation of a still, even though the vacuum pump is running continuously. Since it is not practical to regulate the speed of operation of the vacuum pump, in most instances, it is necessary to provide some additional pressure regulating means to compensate for the above mentioned pressure fluctuations. However, most of the regulating means used at the present time are difficult or tedious to operate and also lack stability of control. Furthermore, some of these pressure regulators are very complex in design and consequently are very expensive.

It is an object of this invention to provide a pressure regulator which is comparatively simple in design, stable in operation, easy to operate, and inexpensive.

It is a further object of my invention to provide a pressure regulator which is readily adjustable to any predetermined pressure requirement, within the operating limits of the particular device.

A further object is to provide an improved device for regulating the pressure of a portion of a fluid system by regulating the pressure differential between that portion and another portion of the system.

My invention contemplates the provision of two vertically and concentrically disposed tubes communicating with each other at the bottom in order to form a liquid trap, in which trap is disposed mercury or some other liquid which is of greater density than, and is non-miscible with, the fluids in the fluid system. Means are provided to regulate the angular disposition of the tubes so that the head of the mercury, or the other liquid, may be regulated to correspond with the desired pressure differential.

Another object is to provide a pressure regulator of the type stated in which the parts are arranged so that a substantial variation in the head of mercury may be obtained by a comparatively slight displacement of the angular disposition of the tubes, without the necessity of providing a separate reservoir for the mercury.

A still further object of my invention is to provide, in a pressure regulator of the type described, a compact and self supporting construction, and one which is provided with means to prevent the mercury or other liquid from escaping from the trap into the system.

Still another object is to provide in a device of this type, extremely sensitive means for regulating the angular disposition of the parts, and a means which is characterized by lack of friction and by high mechanical advantage to facilitate the operation thereof.

Other objects, features and advantages of my invention will become apparent as the description proceeds.

With reference now to the accompanying drawings, in which like reference numerals designate like parts, Fig. 1 is a diagram showing a preferred embodiment of my invention as used in connection with a simple vacuum distillation apparatus;

Fig. 2 is a sectional elevation of the pressure regulator shown in Fig. 1, this section being taken along line 2—2 of Fig. 3;

Fig. 3 is a sectional elevation taken substantially along the line 3—3 of Fig. 2; and Fig. 4 is a plan view of the regulator shown in Figs. 2 and 3.

With reference now to Fig. 1, the distillation apparatus comprises a flask 10, a condenser 11, and a condensate flask 12. A thermometer 43 is associated with the flask 10 in the usual manner, and a closed tube manometer 44 is provided in accordance with the usual practice. A vacuum pump 14 is connected to the distillation apparatus through a pressure regulator 13. The latter comprises a U-shaped member 15 which is mounted on a suitable support 16. The two arms 17 and 18 of the U-shaped member 15 are notched to receive journals 19 and 20 which project from either side of a closed glass container 21. Thus, a pivotal mounting is provided for the container so that it may be suspended in a substantially vertical position from the U- shaped member 15, or may be tilted away from the vertical.

Projecting from the container is an arm 22 which extends upwardly and away from the container and which is curved. A screw 23, threaded through a boss 24 in the connecting portion 25 of the U-shaped member 15, is adapted to engage the arm 22 so as to cause the container 21 to be tilted in the counterclockwise direction, as viewed in Fig. 3.

The arm 22 is preferably formed from glass so that the contact between the end of screw 23 and the side of the arm has a comparatively low coefficient of friction. The shape of the arm is such that continued screwing up of the screw 23 will cause the container to be tilted up through an angle of in excess of sixty degrees. I have found it preferable to curve the arm in such a manner that it roughly approximates a spiral curve with respect to the axis of tilting, the spiral being so oriented that that portion of the arm which is engaged by the end of the screw is disposed approximately perpendicularly to the axis of the screw. Thus, maximum mechanical efficiency can be obtained.

An outlet passageway 26 extends through the journal 19, and communicates with the interior 27 of the container 21. A tube 28 is disposed in the interior of the container in substantially concentric relationship, and an inlet passageway 29 extends through the journal 20 and communicates with the tube 28. The lower end of the tube extends downwardly toward the bottom of the container and terminates in an outlet 30. A body of liquid 37, preferably mercury, is located in the lower part of the container 21, and covers the lower portion of the tube 28. It will be seen that the arrangement is such that as a gas, or other fluid, is caused to pass through the inlet passageway 28, it will bubble through the liquid 37.

The tube 28 is provided with an enlarged portion 31 near the top thereof, which will serve to prevent the liquid from being forced in the reverse direction through the inlet passageway 29 in the event that the flow of gas through the pressure regulator is reversed. Baffles 32 are provided on the exterior of the tube 28 which serve to reduce splashing of the liquid 37, and hence to prevent particles of liquid from being thrown upwardly and drawn out through the outlet passageway 26.

As indicated in Fig. 1, the pressure regulator 13 is disposed between the condensate flask 12 and the vacuum pump 14, by means of conduits 35 and 36, respectively. A flexible connection 33 such as a rubber tube, is provided between the outlet passageway 26 and the conduit 36. A similar flexible conduit 34 connects the inlet passageway 29 with the conduit 35. These flexible connections permit the rotation of the journals 19 and 20 as the container 21 and its associated parts are tilted.

Enlarged portions 39 and 40 are formed on the journals 19 and 20, respectively, just exteriorly of the arms 17 and 18, by means of which the container may be maintained in a median position. L-shaped arms 41 and 42 are threaded into the arms 17 and 18 of the U-shaped member 15, and are swung down to a horizontal position, thereby tending to maintain the journals 19 and 20 in the notched portions of the supporting arms.

In operation, it will be seen that the vacuum pump 14 causes gas to flow from the distillation apparatus through the inlet passageway 29, and thence into the interior 27 of the container 21, and out through the outlet passageway 26 to the pump. The elevation of the liquid 37 in the container 21 serves to create a pressure differential between the inlet and the outlet of the pressure regulator, and hence between the distillation apparatus and the pump. Due to the fact, however, that the chamber 21 is rotatably mounted, the mercury head at the outlet 30 of the tube 28 can be diminished, as indicated by the dotted line position of the parts in Fig. 3. Thus, the pressure differential between the distillation apparatus and the pump can be diminished.

By means of this pressure regulator a very fine regulation of the pressure can be maintained in the distillation apparatus, or in any other type of apparatus. A fine regulation of pressure is especially important, however, in distillation, and it is seldom practical to obtain this regulation by controlling the pump speed.

Although this particular embodiment of my invention has been designed to be used in connection with a distillation apparatus in which the pump is continuously running, it will be readily apparent that it is capable of use in situations where a continuous flow of gas, or other fluid, through the regulator is not the rule. Furthermore, the pressure regulator can be used on a system which operates at greater than atmospheric pressure, in which case, the pump will be on the low pressure side of the system and be connected to the inlet, and the apparatus, or the other portion of the system whose pressure it is desired to regulate, will be connected to the outlet of the pressure regulator.

In the particular application of the invention herein shown, I have found it advantageous to use a concentric disposition of the two tubular elements, the container 21 and the tube 28. However, this arrangement can be varied to suit the particular application, and any other arrangement of the tubular elements, and the manner of establishing communication between the same could well be employed.

Although only a preferred embodiment of my invention has been shown and described herein, it is obvious that various modifications and improvements may be made therein without departing from the spirit of my invention as defined by the appended claims.

I claim:

1. A pressure regulator comprising a closed elongate container, liquid disposed in the lower portion of said container, a tube having a common mounting with said container, and having an outlet eccentrically disposed with respect to the longitudinal axis of said container and communicating with the interior of said container at a point below the surface of said liquid, means supporting said container and tube for rotation about an axis perpendicular to the plane including said longitudinal axis and said eccentrically disposed outlet, means for rotating said container and said tube so that the vertical distance between the outlet of said tube and the surface of said liquid may be varied, and an outlet for said container disposed above the surface of said liquid, whereby the pressure differential between a fluid in said tube and a fluid in the upper portion of said container may be regulated.

2. In combination with an apparatus for fractional distillation, and a vacuum pump in communication therewith, a pressure regulator disposed between said vacuum pump and said distillation apparatus, said pressure regulator comprising two substantially vertically disposed tubes in communication with each other in their lower portion, so as to form a liquid trap, mercury disposed in said liquid trap, and means to regulate the angular disposition of said tubes with respect to the vertical, one of said tubes communicating with said pump and being of larger diameter than the other of said tubes, the other of said tubes communicating with said distillation apparatus, whereby the difference in elevation of said mercury in said trap may be regulated.

3. A pressure regulator comprising an elongate closed container, mercury in the lower part of said container, a tube in said container, the lower portion of which extends into said mercury, and the upper end of which projects through the side wall of said container at its upper part, and an outlet nipple projecting from the side wall of said container and oppositely disposed to and axially aligned with the projecting portion of said tube to form a pair of journals from which said container may be rotatably suspended.

4. A pressure regulator comprising a support providing a pair of bearings, an elongate closed container having laterally extending journals at its upper portion, for cooperation with said bearings, mercury in the lower part of said container, a tube disposed in said container and having its lower open end extending into said mercury, a passageway in one of said journals and communicating with said tube, a passageway through the other of said journals communicating with the interior of said container, an upwardly curved arm projecting from the side of said container in a plane substantially perpendicular to the axis of said journals, and a screw mounted in said support and engaging said arm for regulating the angular inclination of said container.

5. A pressure regulator comprising a support providing a pair of bearings, an elongate closed glass container having laterally extending glass journals integral with said container at its upper portion for cooperation with said bearings, mercury in the lower portion of said container, a tube disposed in said container and having its lower open end extending into said mercury, an upwardly extending glass arm integral with said container and projecting from the side of said container in a plane substantially perpendicular to the axis of said journals, and an adjusting screw mounted in said support and engaging said arm for regulating the angular inclination of said container, said arm being curved so that the portion thereof engaged by said adjusting screw is approximately perpendicular to the axis of said adjusting screw throughout the various angular positions assumed by said container in normal operation.

6. A pressure regulator as claimed in claim 3, in which said container, said tube and said journals are integrally formed of glass, and in which said tube has an enlargement at its upper portion, and an integrally formed flange to reduce splashing.

FLOYD TODD.

REFERENCES CITED

The following references are of record in the file of this patent:

UNITED STATES PATENTS

| Number | Name | Date |
| --- | --- | --- |
| 2,267,594 | Lowry | Dec. 23, 1941 |
| 2,267,274 | Gardner | Dec. 23, 1941 |
| 1,107,887 | Bowser | Aug. 18, 1914 |
| 1,858,202 | Watkins | May 10, 1932 |
| 2,275,648 | Podbielniak | Mar. 10, 1942 |
| 2,350,006 | Wolfner | May 30, 1944 |
| 1,562,380 | Stein | Nov. 17, 1925 |
| 2,182,564 | Lieboff | Dec. 5, 1939 |
| 290,450 | Medden | Dec. 18, 1883 |
| 1,412,620 | Lacke | Apr. 11, 1922 |
| 126,398 | Kaempf | May 7, 1872 |

FOREIGN PATENTS

| Number | Country | Date |
| --- | --- | --- |
| 409,338 | German | Feb. 5, 1925 |
| 11,352 | British | May 11, 1911 |